Dec. 9, 1930.  F. S. BOLTZ  1,783,950
CATCH BASIN FOR SOIL WATER HEAT RECLAIMERS
Filed June 14, 1928  2 Sheets-Sheet 2

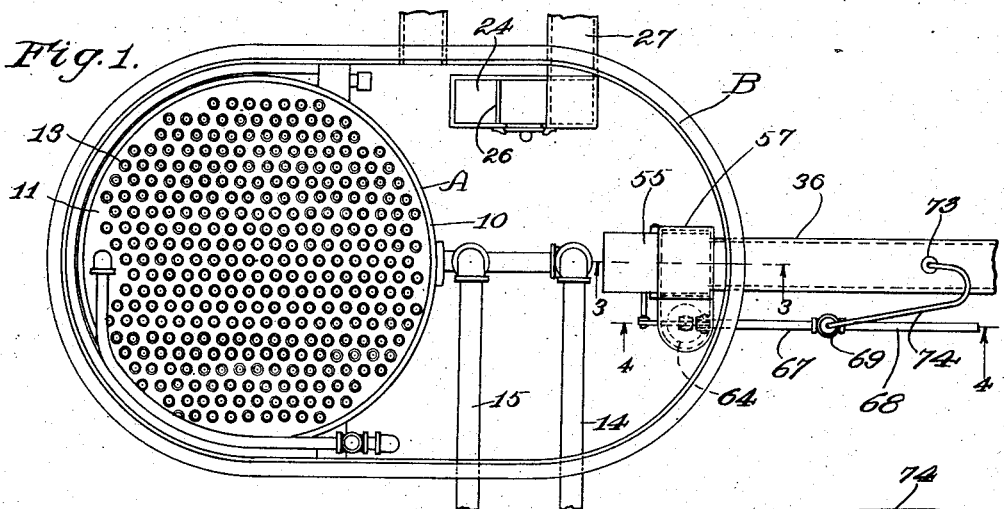
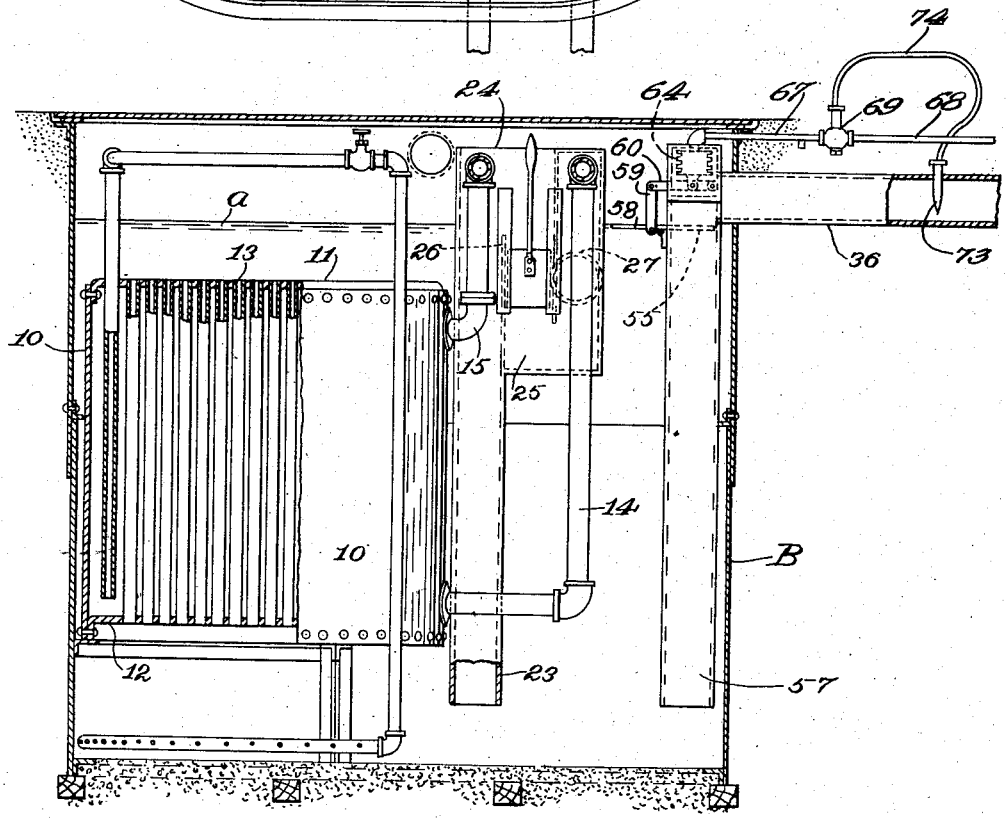

Inventor:
Fred S. Boltz
By Macleod, Calver, Copeland & Dike
Attorneys.

Patented Dec. 9, 1930

1,783,950

UNITED STATES PATENT OFFICE

FRED S. BOLTZ, OF MANSFIELD, MASSACHUSETTS

CATCH BASIN FOR SOIL-WATER-HEAT RECLAIMERS

Application filed June 14, 1928. Serial No. 285,455.

The invention relates to an apparatus for utilizing the heat of a fluid which has already been heated and used and which usually is allowed to run to waste, such as water which has performed its function in a laundry, dye house, wool scouring plant or elsewhere. The present invention is substantially a division of an application filed by me February 17, 1926, Serial No. 88,908. Apparatus embodying the invention comprises a catch basin for the hot soil water and heat transfer element which is mounted inside of the catch basin and consists of a shell having tube sheets at its opposite ends and tubes extending through the shell and connected with said shell all so constructed and arranged that the soil water in the catch basin may come in contact with the outer wall of the shell and may also pass through said tubes. Means are provided for admitting fresh cold water into said shell to be heated and then delivering it to the point desired outside of the catch basin all without mingling the clean water with the soil water. Means are also provided for admitting waste water into the catch basin and for discharging the waste water from the catch basin after its heat has been utilized.

In waste water heat extractors the waste water will frequently come to the catch basin in floods of hot water followed by floods of cold water. When both the cold and hot waste water enter the catch basin near the surface of the waste water already in the catch basin, the cold water tends to cool off the warm water with a loss of heating effect. It is, therefore, desirable to provide some means for diverting the flow during the floods of cool waste water so that it will be delivered to the bottom of the catch basin without mingling with the hot waste water in the upper part of the basin and without coming in contact with the heat reclaimer. One object of the present invention is to provide a thermostatically controlled means whereby when the incoming waste water is above a predetermined temperature it will be delivered into the upper part of the catch basin and whereby when the temperature of the entering waste water is below the predetermined point it will be admitted to the lower part of the catch basin.

The invention will be fully understood from the following description when taken in connection with the accompanying drawings, and the novel features thereof will be pointed out and clearly defined in the claims at the close of this specification.

In the drawings:

Fig. 1 is a plan view of one form of apparatus embodying the invention with the cover of the catch basin removed.

Fig. 2 is a vertical section of the catch basin with the cover of the catch basin in place.

Figure 4:
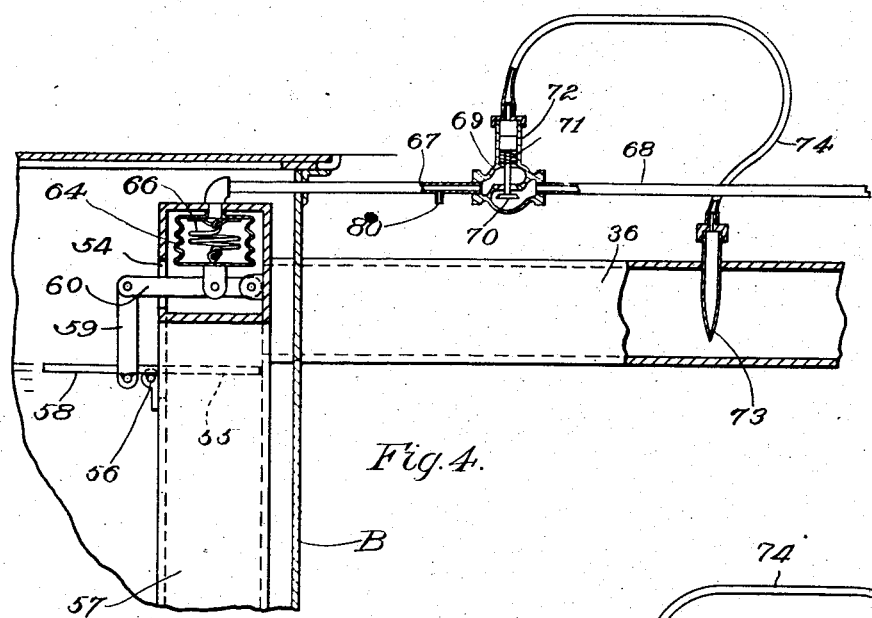
Fig. 4 is a section on line 4—4, Fig. 1 on an enlarged scale showing the passage for the soil water to the lower part of the basin closed.

Referring to the drawings, there is shown at A a heating apparatus consisting of a hollow cylindrical shell 10 having tube sheets 11, 12 at its upper and lower ends respectively and tubes 13 extending through the shell and connected with the tube sheets, the said tubes being open at each end to the interior of the catch basin B in which it is set.

The hot soil water enters the basin through pipe 36. When the soil water in the basin is of sufficient depth to cover the tops of the tubes 13 it will enter the tubes 13 at their upper ends.

An inlet pipe 14 for the fresh water which is to be heated enters the shell 10 through an inlet aperture in the wall of the shell near the lower end thereof just above the lower tube sheet and discharges into said shell. The clean water thus introduced will circulate around the tubes and pass upward to the fresh water outlet 15 through the side wall of the shell just below the upper tube sheet 11. The fresh water will be heated by contact with the hot tubes as the water passes up through the shell and circulates around the tubes.

The hot soil water when cooled by coming in contact with the heat reclaimer containing the cold fresh water will settle to the bottom of the basin. A soil water overflow pipe 23 is provided through which the cooled soil water settling to the bottom will be carried from the lower part of the catch basin upward to the upper part of the catch basin at a point higher than the top of the shell and thence be discharged to the sewer or other suitable place of discharge. This overflow pipe 23 is open at its lower end to the soil water in the lower part of the catch basin. Said pipe 23 extends upward within the catch basin outside of the shell 10 to a point somewhat above the normal level of the hot soil water in the catch basin. The normal level of the soil water is shown at *a* and the upper end of the overflow pipe is shown at 24. Projecting from one side of the overflow pipe near the upper end thereof is a chamber 25, said chamber having a closed bottom. A vertical partition or baffle 26 separates said chamber from waste water in the pipe 23 as far up as the normal level of the waste water, but not to the full height of the said pipe 23. The partition 26 may be the upper portion of one side wall of the overflow pipe. This baffle plate forms a dam over which the waste water as it rises in the overflow pipe can flow into said chamber 25. An outlet pipe 27 leads from said chamber 25 to carry the cooled soil water to the sewer or other discharge point.

The shell 10 may be supported in any suitable way within the catch basin so that the bottom of the shell will be some distance above the bottom of the catch basin.

I have provided a thermostatic mechanism to control the delivery of the waste water into the basin so that when the temperature of the incoming waste water is above a predetermined degree the waste water will be delivered into the upper part of the catch basin, and when it falls below the predetermined temperature it will be admitted to the lower part of the basin. Any convenient form of thermostatically controlled mechanism may be employed, and I do not wish to be limited to the particular form shown in the drawings or to any other particular form. The mechanism shown in the drawings is illustrative of one form suitable for the purpose.

Figure 5:
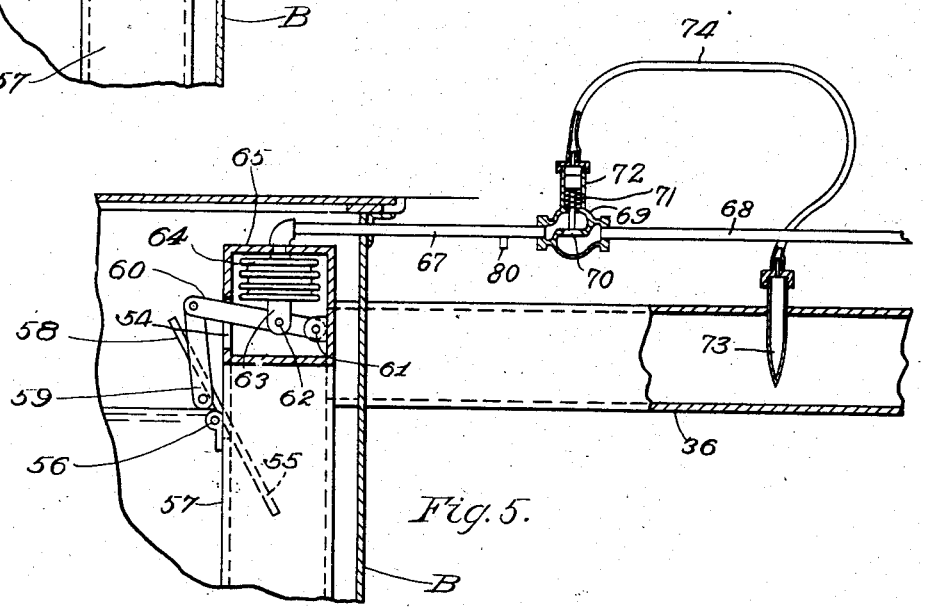
Fig. 5 is a view similar to Fig. 4 but showing the passage to the lower part of the basin open.
Figure 3:
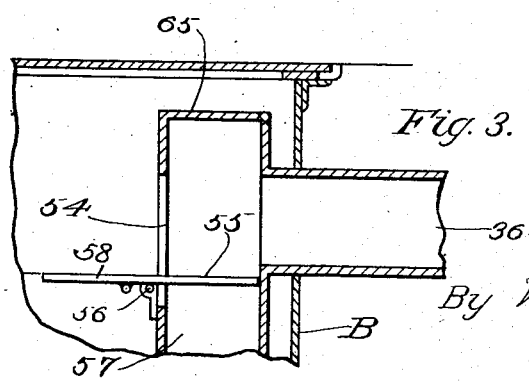
Fig. 3 is a section on line 3—3, Fig. 1 on an enlarged scale.

The soil water inlet pipe 36 is adapted to deliver into the upper part of a pipe 57 which extends down to the lower part of the basin and there has a discharge outlet into the basin. In the upper part of said pipe 57 there is an outlet port 54 which opens into the upper part of the basin. A valve 55 is hinged at 56 to the said pipe 57 at the lower edge of said port 54 and is adapted to lie in horizontal position transversely of the pipe 57 and close the entrance to the by-pass or downward passage through said pipe 57 as shown in Figs. 3 and 4, at which time the waste water will flow through the port 54 into the upper part of the basin. When the said valve is turned up, as shown in Fig. 5, the incoming waste water will take its natural course due to gravity and flow down through the by-pass 57 into the lower part of the basin rather than through the port 54 into the upper part of the basin, even though the port 54 is partially open.

The valve 55 is actuated by thermostatically controlled mechanism as follows: The valve has a handle or lever extension 58 which projects into the basin and is pivotally connected by a link 59 with one end of a lever 60, whose other end is pivoted and fulcrumed at 61 to a fixed support. Said lever 60 is pivotally connected intermediate its ends at 62 to the stem 63 of a bellows diaphragm 64 in the upper part of the pipe 57. Said pipe 57 preferably has a closed upper end 65. A coil spring 66 within the bellows 64 normally maintains the bellows in collapsed form, and thereby hold the valve 55 open as shown in Fig. 5. A pipe 67 is connected at one end with the bellows and opens into the interior thereof. Said pipe communicates at its other end with any suitable source of pressure. Preferably it is connected with the city water supply, for instance, as supplied through a pipe 68 having a three-way coupling 69. The passage through said coupling from the pipe 68 to the pipe 67 is controlled by a valve 70, which is normally closed by a spring 71 in the tubular casing or neck 72 of the coupling 69. A thermostat 73 projects into the pipe 36 and has a tubular connection 74 with the casing 72. The bulb 73 of the thermostat may contain any suitable expansible element either liquid or gas. When the temperature of the incoming waste water flowing through the pipe 36 is above a predetermined degree, the valve 70 will be opened by the expansion of the element in the thermostat and tube 74, thereby allowing water under pressure in the pipe 68 to be effective in pipe 67 to hold the bellows 64 in expanded form, and thus hold the valve 55 closed, as shown in Figs. 3 and 4. This permits the waste water to flow through the port 54 into the upper part of the basin and shuts off the flow through the by-pass into the lower part of the basin.

When the temperature of the waste water passing through the pipe 36 falls below the predetermined degree, the expansive element in the thermostat contracts and allows the spring 71 to expand and close the valve 70 and shut off the water pressure on the bellows 64. A bleeder port 80 is provided in the pipe 67 to relieve the pressure in said pipe when the valve 70 is closed. The spring 66 will then collapse the bellows 64 which will turn the lever 60 and valve 55 into inclined position, as shown in Fig. 5 and allow the incoming waste water to flow down through the by-pass 57 into the lower part of the basin.

When the temperature of the incoming waste water again rises above the predetermined degree, the valve 70 will be opened, allowing the pressure in the pipe 67 to expand the bellows 64 and to turn the valve 55 into horizontal position and to close the inlet to the by-pass 57 and the waste water will again flow through port 54 into the upper part of the basin.

What I claim is:

1. In combination with a catch basin, means for admitting water into said basin at inlet ports of different elevation, and temperature controlled means responsive to the temperature of the water being admitted whereby when the water is above a predetermined temperature the water will be admitted to the basin at the higher point and whereby when the temperature is below the predetermined degree the water will be discharged into the basin at the lower point in combination with a heat reclaimer positioned within said basin, said heat reclaimer having a chamber, an inlet to and an outlet therefrom for water to be heated, tubular passages through said chamber open at each end to soil water in the basin, and means for preventing the soil water from mingling with the clean water.

2. In combination with a catch basin, means for admitting water into said basin at inlet ports of different elevation, and temperature controlled means responsive to the temperature of the water being admitted whereby when the water is above a predetermined temperature the water will be admitted to the basin at the higher point and whereby when the temperature is below the predetermined degree the water will be discharged into the basin at the lower point in combination with a heat reclaimer positioned within said basin, said heat reclaimer having a chamber, an inlet to and an outlet therefrom for water to be heated, and means for preventing the soil water from mingling with the clean water.

3. Apparatus of the character described comprising a catch basin for soil water, an inlet conduit for the soil water leading into the upper part of the basin, an upright conduit within the basin extending from the upper to the lower part thereof, said inlet conduit discharging into the upper part of said upright conduit, said upright conduit having two outlets one of which is adapted to discharge into the upper part of the basin, the other outlet being adapted to discharge into the lower part of the basin, a valve in said said upright conduit adapted to close either one of said discharge outlets while the other outlet is left open and valve actuating mechanism including means responsive to the temperature of the water being admitted whereby when the inflowing water is above a predetermined temperature the valve actuating mechanism will open the passage to the upper part of the basin and whereby when the temperature of the inflowing water is below the predetermined temperature the valve will be actuated to open the passage to the lower part of the basin.

4. Apparatus of the character described comprising a catch basin for soil water, an inlet conduit for the soil water leading into the upper part of the basin, an upright conduit within the basin extending from the upper to the lower part thereof, said inlet conduit discharging into the upper part of said upright conduit, said upright conduit having two outlets one of which is adapted to discharge into the upper part of the basin, the other outlet being adapted to discharge into the lower part of the basin, a valve in said upright conduit adapted to close either one of said discharge outlets while the other outlet is left open and valve actuating mechanism including means responsive to the temperature of the water being admitted whereby when the inflowing water is above a predetermined temperature the valve actuating mechanism will open the passage to the upper part of the basin and whereby when the temperature of the inflowing water is below the predetermined temperature the valve will be actuated to open the passage to the lower part of the basin, in combination with a heat reclaimer positioned within said basin whereby the walls of the heat reclaimer are exposed to the soil water, said heat reclaimer having a water chamber, an inlet to and an outlet therefrom for water to be heated and means for preventing the soil water from mingling with the water to be heated.

In testimony whereof I affix my signature.

FRED S. BOLTZ.